United States Patent
Agrawal et al.

(10) Patent No.: US 8,204,671 B2
(45) Date of Patent: Jun. 19, 2012

(54) SYSTEM AND METHOD OF ESTIMATING GAS TURBINE ENGINE PERFORMANCE

(75) Inventors: Rajendra K. Agrawal, S. Windsor, CT (US); Ravi Rajamani, West Hartford, CT (US); William F. Schneider, Cromwell, CT (US); Coy Bruce Wood, Ellington, CT (US)

(73) Assignee: United Technologies Corporation, Hartford, CT (US)

( * ) Notice: Subject to any disclaimer, the term of this patent is extended or adjusted under 35 U.S.C. 154(b) by 496 days.

(21) Appl. No.: 12/467,992

(22) Filed: May 18, 2009

(65) Prior Publication Data

US 2010/0292905 A1 Nov. 18, 2010

(51) Int. Cl.
G06F 19/00 (2011.01)
G06G 7/70 (2006.01)

(52) U.S. Cl. .......................................................... 701/100
(58) Field of Classification Search .................... 60/779; 701/100

See application file for complete search history.

(56) References Cited

U.S. PATENT DOCUMENTS

| | | | |
|---|---|---|---|
| 3,513,692 A | 5/1970 | Slone | |
| 4,060,979 A | 12/1977 | Elsaesser et al. | |
| 4,227,369 A | 10/1980 | Williams | |
| 4,528,844 A | 7/1985 | Couch | |
| 4,888,948 A | 12/1989 | Fisher et al. | |
| 5,070,722 A | 12/1991 | Hawman et al. | |
| 5,622,045 A * | 4/1997 | Weimer et al. | 60/204 |
| 5,726,891 A | 3/1998 | Sisson et al. | |
| 6,513,333 B2 | 2/2003 | Sugitani | |
| 6,668,655 B2 | 12/2003 | Harrold et al. | |
| 6,845,943 B2 | 1/2005 | Chambers et al. | |
| 2002/0184951 A1* | 12/2002 | Bonanni | 73/660 |
| 2009/0014245 A1* | 1/2009 | Shevchenko et al. | 184/6.4 |
| 2009/0112519 A1* | 4/2009 | Novis et al. | 702/183 |
| 2010/0003121 A1* | 1/2010 | Berryann et al. | 415/1 |
| 2010/0287907 A1* | 11/2010 | Agrawal et al. | 60/39.091 |
| 2010/0292905 A1* | 11/2010 | Agrawal et al. | 701/100 |
| 2011/0179763 A1* | 7/2011 | Rajamani et al. | 60/39.092 |

FOREIGN PATENT DOCUMENTS

WO 93/04365 8/1991

\* cited by examiner

*Primary Examiner* — James Trammell
*Assistant Examiner* — Michael D Lang
(74) *Attorney, Agent, or Firm* — Carlson Gaskey & Olds P.C.

(57) ABSTRACT

An example method of estimating gas turbine engine performance deterioration includes monitoring debris in at least a portion of an engine and estimating performance deterioration of at least one component of the engine using information from the monitoring. The method may use gas path parameters, such as pressures, temperatures, and speeds to establish the estimated performance deterioration. An example gas turbine engine performance assessment system includes a debris monitoring system configured to monitor debris moving through a portion of an engine and a controller programmed to estimate performance deterioration of at least one component of the engine based on information from the debris monitoring system.

16 Claims, 4 Drawing Sheets

SYSTEM AND METHOD OF ESTIMATING GAS TURBINE ENGINE PERFORMANCE

BACKGROUND

This application relates generally to monitoring debris, and more particularly, to estimating deterioration of a gas turbine engine performance using information from the monitoring.

Gas turbine engines are known and typically include multiple sections, such as an inlet section, an inlet particle separation section, a fan section, a compression section, a combustor section, a turbine section, and an exhaust nozzle section. The fan section or the compression section moves air into the engine. The air is compressed as the air flows through the compression section. The compressed air is then mixed with fuel and combusted in the combustor section. Products of the combustion are expanded through turbine sections to rotatably drive the engine.

As known, operating the engine deteriorates the components of the engine. The rate of deterioration is predictable in many operating environments based on the time in service, for example. Many engines, however, operate in debris laden environments, which can cause the rate of deterioration to vary. For example, debris, like sand, moving through the engine can accelerate wear and erosion of the components. Increasing the debris ingested into the engine thus often accelerates the rate of component deterioration due to wear and erosion caused by the debris. The debris can also undesirably glassify on the surfaces of components within the engine and have an adverse effect on the performance of those components. Operating the engine with deteriorated components can affect the performance of individual component and the overall performance of the engine.

SUMMARY

An example method of estimating gas turbine engine performance deterioration includes monitoring debris in at least a portion of an engine and estimating performance deterioration of at least one component of the engine using information from the monitoring. The method may use gas path parameters, such as pressures, temperatures, and speeds to establish the estimated performance deterioration.

Another example method of estimating deterioration of a gas turbine engine includes monitoring airflow moving through a portion of an engine to detect a presence of debris carried by the airflow, determining a characteristic of the debris, and estimating performance deterioration of at least one component of the engine based at least in part on the characteristic.

An example gas turbine engine performance assessment system includes a debris monitoring system configured to monitor debris moving through a portion of an engine and a controller programmed to estimate performance deterioration of at least one component of the engine based on information from the debris monitoring system.

These and other features of the example disclosure can be best understood from the following specification and drawings, the following of which is a brief description.

DETAILED DESCRIPTION

Figure 1:
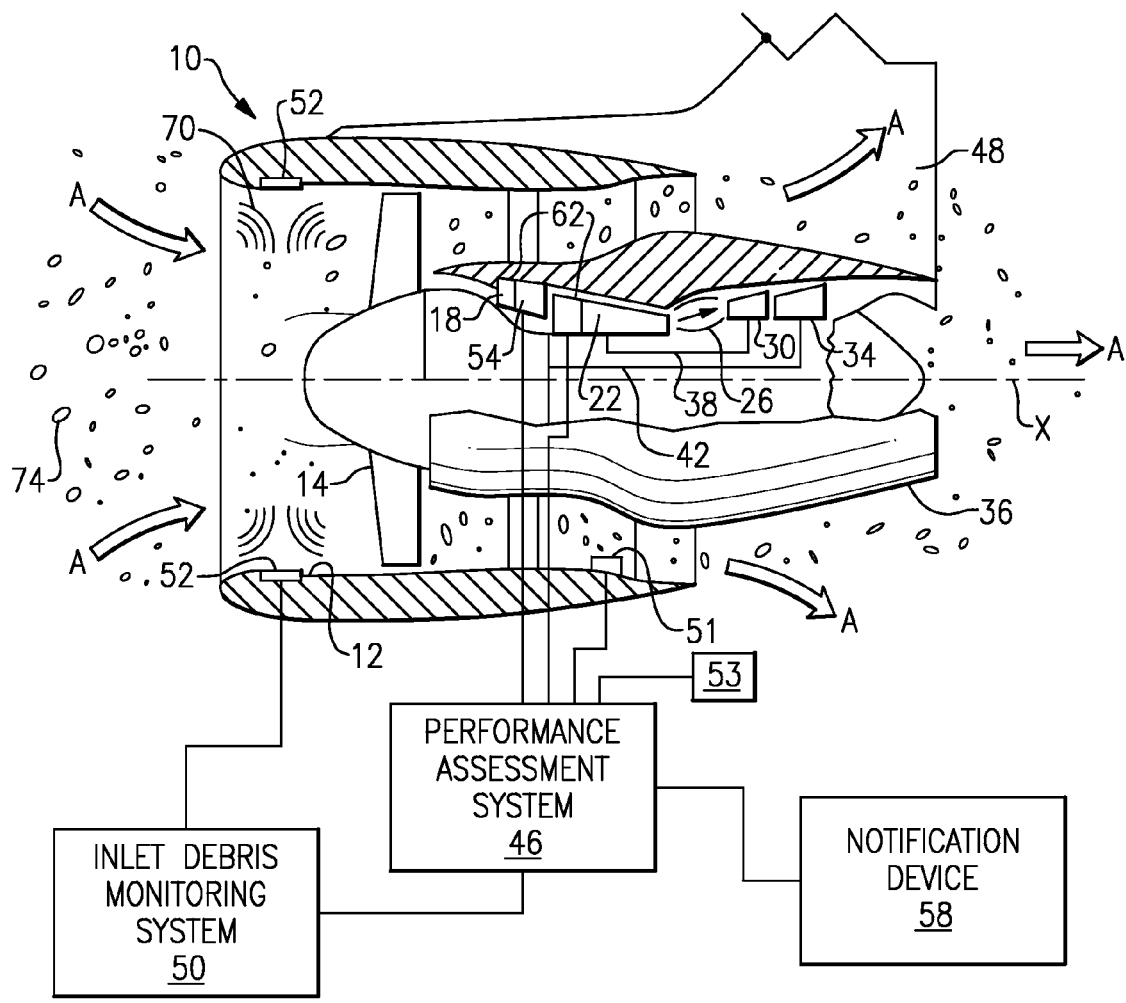
FIG. 1 shows a partial schematic view of an example gas turbine engine and an example performance assessment system.

FIG. 1 schematically illustrates an example turbofan gas turbine engine 10 including (in serial flow communication) an inlet section 12, a fan section 14, a low-pressure compressor 18, a high-pressure compressor 22, a combustor 26, a high-pressure turbine 30, and a low-pressure turbine 34 and a exhaust nozzle section 36. The gas turbine engine 10 is circumferentially disposed about an engine centerline X. During operation, air A is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26. The residual energy is then expanded through the nozzle section to produce thrust.

In a two-spool design, the high-pressure turbine 30 utilizes the extracted energy from the hot combustion gases to power the high-pressure compressor 22 through a high speed shaft 38, and the low-pressure turbine 34 utilizes the extracted energy from the hot combustion gases to power the low-pressure compressor 18 and the fan section 14 through a low speed shaft 42.

The examples described in this disclosure are not limited to the two-spool engine architecture described and may be used in other architectures, such as a single-spool axial design, a three-spool axial design and a three spool axial and centrifugal design, and still other architectures.

Figure 2:
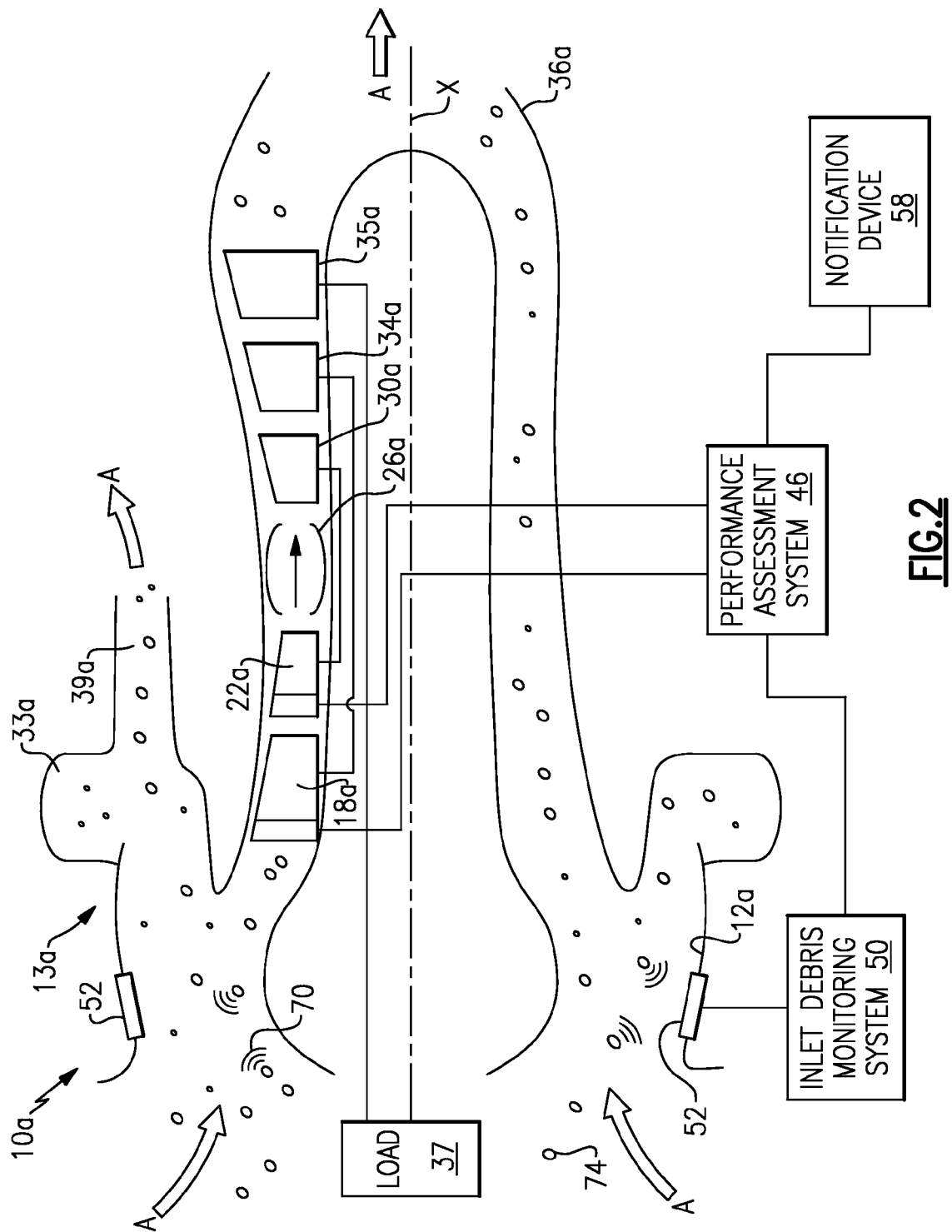
FIG. 2 shows a partial schematic view of an example turboshaft gas turbine engine and the performance assessment system.

The examples described are also not limited to the turbofan gas turbine engine 10. For example, FIG. 2 schematically illustrates an example turboshaft gas turbine engine 10a including (in serial flow communication) an inlet section 12a, an inlet particle separator section 13a, a low-pressure compressor 18a, a high-pressure compressor 22a, a combustor 26a, a high-pressure turbine 30a, a low-pressure turbine 34a, and a power turbine section 35a. The inlet particle separator section 13a includes an inlet particle separator scroll 33a and a blower 39a as is known. A bypass flow of air moves through the blower 39a in this example.

The turbines 30a and 34a of the gas turbine engine 10a extract energy from the hot combustion gases flowing from the combustor 26a. The residual energy is expanded through the power turbine section to produce output power that drives the external load 37, such as helicopter rotor system. Air is exhausted from the engine 10a at the exhaust nozzle section 36a. There are various types of engines, in addition to the turbofan gas turbine engine 10 of FIG. 1 and the turboshaft gas turbine engine 10a, that could benefit from the examples disclosed herein, which are not limited to the designs shown.

In this example, a performance assessment system 46 mounts to an aircraft 48 propelled by the gas turbine engine 10, for example. The engine assessment system 46 is in operative communication with an inlet debris monitoring system 50, an engine gas path monitoring system 51 and aircraft monitoring system 53, a plurality of components 54 of the low pressure compressor 18, a notification device 58, and vanes 62 of the variable vane sections of the low-pressure compressor 18 and the high-pressure compressor 22.

The inlet debris monitoring system 50 receives information from debris detectors 52 that are mounted to the inlet section of the gas turbine engine 10. The debris detectors 52 are configured to measure a static charge 70 from debris 74 carried by the air A that is pulled into the gas turbine engine 10 by the fan section 14. In this example, the debris detectors 52 measure the static charge 70 of the debris 74 within the inlet section 14. Other examples include debris detectors 52 configured to measure the static charge 70 of the debris 74 in other areas in or near the engine 10, such in the low-pressure compressor 22 or forward the fan section 14.

The example debris monitoring system 50 provides the performance assessment system 46 with at least one characteristic of the debris 74. In this example, the debris monitoring system 50 quantifies the amount of the debris 74 entering the gas turbine engine 10 based on the amount of static charge 70. Other determinable characteristics include the type of the debris 74 carried by the air A. Sand is one example type of the debris 74. A person skilled in the art and having the benefit of this disclosure would be able to quantify the debris 74 or determine other characteristics of the debris 74 using the debris monitoring system 50.

Examples of the information provided to the engine assessment system 46 by the engine gas path monitoring system 51 include the speed, the temperature, and the pressure of air moving through the gas paths within the engine 10. Examples of the information provided to the engine assessment system 46 by the aircraft monitoring system 53 include aircraft altitude and aircraft speed.

In this example, the plurality of components 54 of the low-pressure compressor 18 are the blades of the low-pressure compressor 18. The performance assessment system 46 uses the characteristics of the debris 74 and other information to determine the performances losses of the plurality of components 54. The performance assessment system 46 utilizes the notification device 58 to notify a technician, of, for example, performance losses exceeding certain values.

The vanes 62 of the variable vane sections are adjustable relative to flow of air through the gas turbine engine 10. Pneumatic or hydraulic actuators typically actuate the vanes 62 based on a schedule. Operating the gas turbine engine 10 with the vanes 62 in some positions, for example more open relative to a nominal vane schedule, lowers the impact of the debris 74 on the gas turbine engine 10, which can advantageously increase the time period before repairs or replacement is necessary due to substantial drops in performance. For example, repositioning the vane 62 to a more open position may make the debris 74 less likely to impact the performance of the components 54 due to positioning of these vanes 62 in a more optimum aerodynamic setting. Changing the positions of other types of variable position components can also lower the impact of the debris 74 on the gas turbine engine 10.

The example performance assessment system 46 adjusts the vanes 62 in response to the characteristics of the debris 74. In this example, the performance assessment system 46 adjusts the variable vane section 62 more open relative to the nominal schedule when the debris detectors 52 detect that the fan section 14 is pulling large amounts of debris 74 into the gas turbine engine 10. A sandy desert is one example of an environment likely to result in a large amount of debris 74 entering the gas turbine engine 10. In other examples, the performance assessment system 46 adjusts other variable position components of the gas turbine engine 10 to positions that lower the impact of the debris 74 on the gas turbine engine 10.

Figure 3:
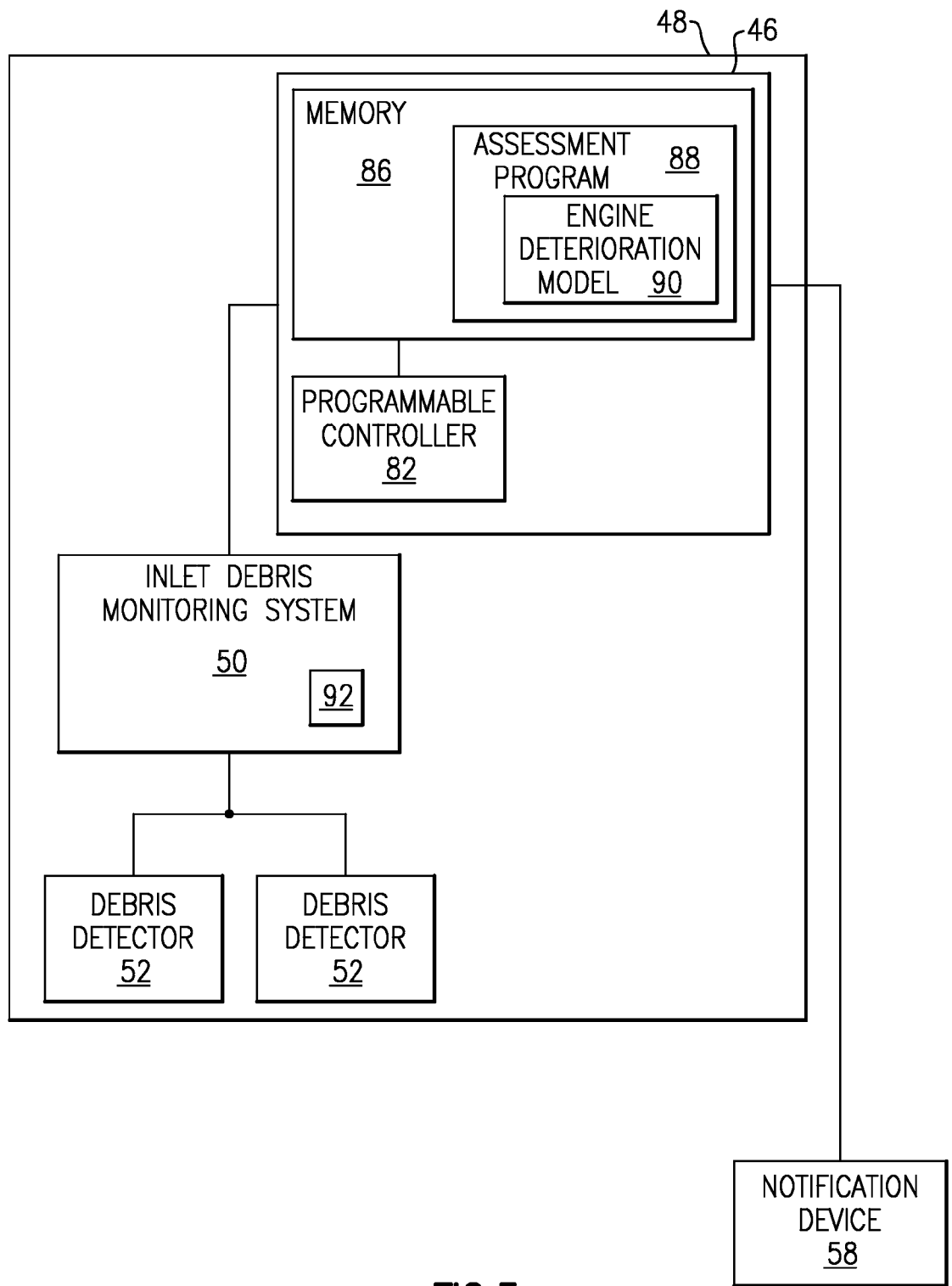
FIG. 3 shows a schematic view of the performance assessment system FIG. 1.
Figure 4:
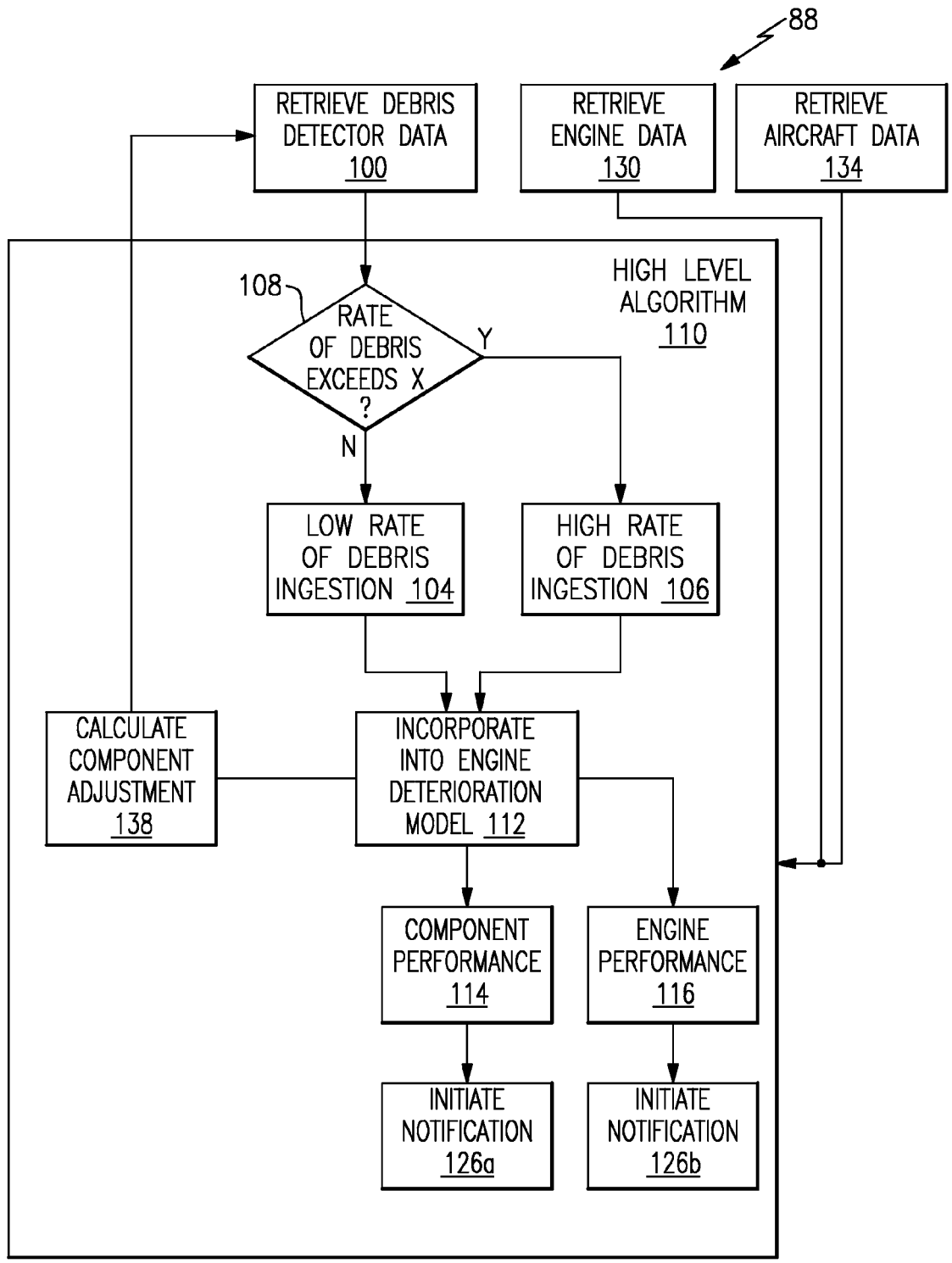
FIG. 4 schematically shows the flow of an example program for the FIG. 1 performance assessment system.

Referring now to FIGS. 3 and 4 with continuing reference to FIG. 1, the example performance assessment system 46 includes a programmable controller 82 and a memory portion 86. The example programmable controller 82 is programmed with a performance assessment program 88 that incorporates an engine deterioration model 90. In this example, the inlet debris monitoring system 50 includes a signal conditioning unit 92 that converts static charge measurement from the debris detectors 52 into a DC millivolt measurement to estimate the quantity and quality of the debris and provides this information to the engine deterioration model 90. The performance assessment program 88, a type of computer program, uses the debris data and the Gas path measurements, such as temperature, pressure, and speed, when estimating losses in performance of the components 54 of the engine 10 and losses in the overall performance of the engine 10.

The performance assessment system 46 is configured to initiate a notification through the notification device 58 in response to the estimated performance losses. In this example, the notification device 58 is located apart from the aircraft 48. In another example, the notification device 58 is inside the aircraft 48. The notification may indicate that the components 54 have experienced significant performance losses, for example, and that the engine 10 will require more fuel to overcome the associated losses and that it will operate at increased temperatures which may limit the power available from the engine and its ability to complete some of the aircraft missions.

It should be noted that many computing devices can be used to implement various functionality, such as incorporating the characteristics of the debris 74 detected by the debris detectors 52 into the performance assessment system 46. In terms of hardware architecture, such a computing device can include a processor, the memory portion 86, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor or controller 82 may be a hardware device for executing software, particularly software stored in the memory portion 86. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory portion 86 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory portion 86 may include the assessment program 88 and one or more additional separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory portion 86, to communicate data to and from the memory portion 86, and to generally control operations of the computing device pursuant to the software. Software in memory, in whole or in part, is read by the processor, perhaps buffered within the processor, and then executed.

An example flow of the example assessment program 88 includes a step 100 of retrieving debris data from the debris detectors 52 through the inlet debris monitoring system 50. This data is provided to a high level algorithm 110, which then calculates the rate of the debris 74 entering the engine 10. In one example, a low level algorithm (not shown) calculates the rate and type of the debris 74 entering the engine 10 and provides this debris data to the high level algorithm 110.

If the rate of the debris 74 does not exceed a value X in a step 108, it progresses to the low rate leg 104 for estimating the performance deterioration. If the rate of the debris 74 exceeds the value X in the step 108, the assessment program 88 progresses to the high rate leg 108 for estimating the performance deterioration of the high level algorithm 110. In one example, the step 108 moves to the high rate leg 108 of the high level algorithm 110 after determining that the engine 10 is ingesting more than one pound of sand per hour, and that the sand has a particular composition. The value X in the step 108 is thus one pound of sand that has the particular composition. The high level algorithm 110 moves to the low rate leg 104 when sand ingestion is below the value X to conserve power for example.

The high level algorithm 110 includes a step 112 of incorporating the debris data into the engine deterioration model 90. The high level algorithm 110 utilizes information from the step 112 to establish many types of information about the components 54 of the engine 10.

For example, a step 114 estimates if the debris, based on the cumulative amount of debris 74, would affect the performance of the components 54. If so, the high level algorithm 110 initiates a notification at a step 126a on the notification device 58.

A step 116 estimates if the debris, based on the cumulative amount of debris 74, would affect the overall performance of the engine 10. If so, the high level algorithm 110 initiates a notification at a step 126b on the notification device 58.

The notification on the devices 126a, 126b can take many forms, such as a flashing light type notification or a visual display of the total amount of the debris 74 that have entered the engine 10. In another example, the notification at the step 126 is a numerical estimate of the performance loss associated with the damage to the components.

An observer of the notification initiated at the steps 126a, 126b would be able to appropriately react to the notification. For example, a technician charged with estimating fuel requirements for a flight may react by increasing the estimated fuel requirements for the engine 10 in response to the notifications 126a, 126b on the display device 58.

The high level algorithm 110 initiates notifications based on the size of the debris 74 moving through the engine 10 in some examples. For example, a notification associated with course debris triggers an assessment of performance degradation, whereas a notification associated with fine debris triggers another type of assessment.

The example high level algorithm 110 and particularly the engine deterioration model 90 at the step 112 utilizes additional data to determine whether to initiate the notifications at the steps 126. For example, a step 130 provides the high level algorithm 110 with engine data, such as engine speeds, engine pressures, etc. A step 134 provides the high level algorithm 110 with aircraft data, such as flight speeds, flight altitudes, etc. In other examples, the high level algorithm 110 initiates notifications using the amount of component life used, the available power levels, etc.

At a step 138, the high level algorithm 110 calculates and initiates adjustments to adjustable vanes within the variable vane section 62 of the engine 10. The high level algorithm 110 initiates changes to the positions of these variable position components, for example more open relative to the nominal vane schedule, within the engine 10 to lessen engine performance losses due to the debris 74.

Features of the disclosed embodiments include estimating loss in gas turbine engine performance and gas turbine engine component performance, and adjusting the estimates based on debris entering the engine.

Although a preferred embodiment has been disclosed, a worker of ordinary skill in this art would recognize that certain modifications would come within the scope of this invention. For that reason, the following claims should be studied to determine the true scope and content of this invention.

We claim:

1. A method of estimating gas turbine engine performance deterioration comprising:
    monitoring debris in at least a portion of an engine;
    estimating performance deterioration of at least one component of the engine using information from the monitoring; and
    adjusting a variable component of the engine to slow performance deterioration due to the debris.

2. The method of claim 1 including monitoring at least one of a pressure, a temperature, or a speed of a gas moving through a gas path.

3. The method of claim 1 wherein the variable component comprises a variable compressor vane.

4. The method of claim 1 wherein the at least one component comprises the variable component.

5. The method of claim 1 wherein the monitoring includes quantifying the debris.

6. The method of claim 1 including using an engine deterioration model for said estimating.

7. The method of claim 1 wherein the estimating comprises estimating a loss in engine performance.

8. The method of claim 1 including initiating a notification if the estimated performance deterioration corresponds to an established value.

9. A method of estimating deterioration of a gas turbine engine comprising:
    monitoring airflow moving through a portion of an engine to detect a presence of debris carried by the airflow;
    determining a characteristic of the debris;

estimating performance deterioration of at least one component of the engine based at least in part on the characteristic; and estimating performance losses of the at least one component of the engine using a programmable controller.

10. The method of claim 9 including adjusting at least one component of the engine in response to the characteristic to slow performance deterioration due to the debris.

11. The method of claim 9 wherein the characteristic comprises an amount of debris.

12. The method of claim 9 wherein the characteristic comprises a type of debris.

13. The method of claim 9 wherein the portion of the engine comprises an area extending forward a fan section of the engine.

14. A gas turbine engine performance assessment system comprising:
   a debris monitoring system configured to monitor debris moving through a portion of an engine; and
   a controller programmed to estimate performance deterioration of at least one component of the engine based on information from the debris monitoring system, wherein the controller is programmed with an engine deterioration model that estimates deterioration.

15. The system of claim 14 wherein the controller is programmed to estimate performance deterioration of the at least one component using at least one of a pressure, a temperature, or a speed of a gas moving through a gas path.

16. The system of claim 14 wherein the controller is programmed to adjust at least one component of the engine to slow deterioration due to the debris.

* * * * *